United States Patent
Lamb

(10) Patent No.: US 9,137,350 B2
(45) Date of Patent: Sep. 15, 2015

(54) METHOD AND APPARATUS FOR COMMUNICATING WITH BATTERY-POWERED ELECTRONIC DEVICES

(71) Applicant: Ecolink Intelligent Technology, Inc., Carlsbad, CA (US)

(72) Inventor: Michael Lamb, Rancho Santa Fe, CA (US)

(73) Assignee: Ecolink Intelligent Technology, Inc., Carlsbad, CA (US)

( * ) Notice: Subject to any disclaimer, the term of this patent is extended or adjusted under 35 U.S.C. 154(b) by 76 days.

(21) Appl. No.: 13/801,266

(22) Filed: Mar. 13, 2013

(65) Prior Publication Data

US 2014/0273867 A1 Sep. 18, 2014

(51) Int. Cl.
*H04M 1/725* (2006.01)

(52) U.S. Cl.
CPC .................................. *H04M 1/72533* (2013.01)

(58) Field of Classification Search
CPC ............................. H04W 52/0216; Y02B 60/50
USPC ............................................... 455/67.11, 522
See application file for complete search history.

(56) References Cited

U.S. PATENT DOCUMENTS

| | | | | |
|---|---|---|---|---|
| 6,078,819 | A * | 6/2000 | Ciccone et al. | 455/463 |
| 6,480,476 | B1 * | 11/2002 | Willars | 370/311 |
| 6,829,493 | B1 * | 12/2004 | Hunzinger | 455/574 |
| 7,505,795 | B1 * | 3/2009 | Lim et al. | 455/574 |
| 7,788,332 | B2 * | 8/2010 | Manohar et al. | 709/207 |
| 2004/0029620 | A1* | 2/2004 | Karaoguz | 455/574 |
| 2004/0038707 | A1* | 2/2004 | Kim | 455/554.1 |
| 2004/0167464 | A1* | 8/2004 | Ireland et al. | 604/66 |
| 2006/0252443 | A1* | 11/2006 | Sammour et al. | 455/518 |

* cited by examiner

*Primary Examiner* — David Bilodeau
(74) *Attorney, Agent, or Firm* — Thomas Thibault

(57) ABSTRACT

An apparatus, system and method for communicating with a battery-powered electronic device having a wireless receiver, wherein the receiver is power-cycled once every predetermined time period. In one embodiment, the method comprises, determining a power cycle time of the battery-powered electronic device, the power cycle time comprising a time period over which the battery-powered electronic device completes a cycle of operating in a dormant state of operation and operating in an active mode of operation, defining a transmission time duration equal to or greater than the power cycle time, storing the transmission time duration in a memory, and transmitting a signal intended for the battery-powered electronic device, the signal lasting for at least the transmission time duration.

16 Claims, 3 Drawing Sheets

METHOD AND APPARATUS FOR COMMUNICATING WITH BATTERY-POWERED ELECTRONIC DEVICES

BACKGROUND

I. Field of Use

The present application relates to battery-operated battery-powered electronic devices. More specifically, the present application relates to a method and apparatus for communicating with battery-operated battery-powered electronic devices.

II. Description of the Related Art

Battery-powered electronic devices are prevalent in today's modern world. Battery power is needed in mobile applications or where a constant source of power is not available. In some cases, these battery-powered electronic devices each comprise an RF receiver for receiving commands or information from a transmission source. For example, in a home application, an electronic window shade may contain an RF or infrared receiver for receiving commands from a handheld, wireless remote control device. In another home application, a wireless thermostat may comprise a receiver for receiving a command to transmit a sensed room temperature to a central monitoring panel.

It is well-known to power-cycle battery-powered electronic devices some battery-powered devices in order to increase battery life. For example, an battery-powered electronic device may operate with most of its circuits de-energized, or in a low power-consuming state, while its receiver operates as normal to determine when a signal is received for action by the battery-powered electronic device. In another example, the receiver itself is additionally power-cycled to save even more power. In this example, some form of synchronization with a transceiver is desirable, because the smaller the duty cycle, the less likely it is that the receiver will actually receive a signal that is intended for it. The problem with synchronization is that it adds cost and complexity to the battery-powered electronic device.

It would be desirable to enable power savings realized by power-cycling while eliminating the need to provide transmitter-receiver synchronization.

SUMMARY

The embodiments described herein relate to a system, method, and apparatus for communicating with battery-powered electronic devices, wherein one or more of the battery-powered devices is power-cycled once every predetermined time period. In one embodiment, the method comprises determining a power cycle time of the battery-powered electronic device, the power cycle time comprising a time period over which the battery-powered electronic device completes a cycle of operating in a dormant state of operation and operating in an active mode of operation, defining a transmission time duration equal to or greater than the power cycle time, storing the transmission time duration in a memory of a transmitter; and transmitting a signal intended for the battery-powered electronic device, the signal lasting for at least the transmission time duration.

In another embodiment, a system for communicating with battery-powered electronic devices is disclosed, comprising a battery-powered electronic device comprising a receiver for receiving wireless signals, a memory for storing processor-executable instructions and a power cycle time, and a processor for executing the processor-executable instructions that cause the battery-powered device to processing signals received by the receiver and to place at least a portion of circuitry associated with the battery-powered electronic device in a power-saving mode of operation at predetermined time intervals equal to the power cycle time, and a transceiver located remotely from the battery-powered electronic device, comprising, a transmitter to wirelessly transmit the wireless signals to the battery-powered electronic device, a memory for storing processor-executable instructions and a transmission time duration, and a processor coupled to the memory and transmitter, for executing the processor-executable instructions that cause the transceiver to retrieve the transmission time duration from the memory, to generate a signal intended for the battery-powered electronic device, and to send the signal to the transmitter for transmission to the battery-powered electronic device, wherein the transmitter transmits the signal for a duration equal to or greater than the transmission time duration.

BRIEF DESCRIPTION OF THE DRAWINGS

The features, advantages, and objects of the present invention will become more apparent from the detailed description as set forth below, when taken in conjunction with the drawings in which like referenced characters identify correspondingly throughout, and wherein.

DETAILED DESCRIPTION

The present description relates to methods and apparatus for communicating with battery-powered electronic devices, especially battery-powered electronic devices having a wireless receiver that employ the use of power-cycling to save power in such devices. Power-cycling refers to the well-known method of "waking up" a portion or all of an electrical device's circuitry in order to determine whether there is a need to further process information. Such a process is typically carried out by a microcontroller (MCU) to provide computation and data processing, control the receiver and/or sensors, and manage memory and power. An internal clock, often called a watchdog timer, is used to wake up the system when a predetermined time period expires. By setting this timer, a device can wake up periodically to perform its functionalities. On the other hand, devices typically lose their functionalities while sleeping.

Figure 1:
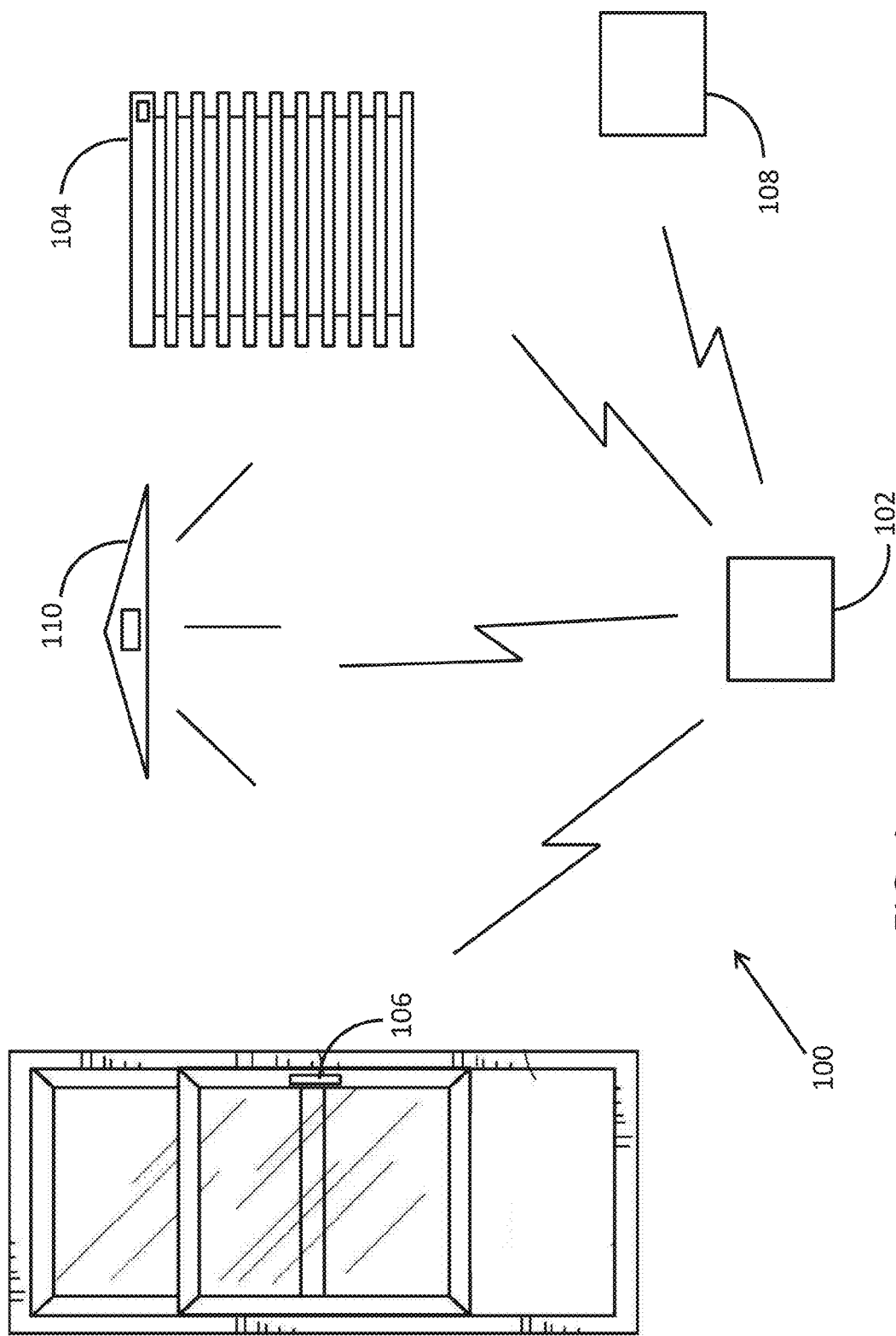
FIG. 1 illustrates a system for communicating with battery-powered electronic devices.

FIG. 1 illustrates a system 100 for communicating with battery-powered electronic devices. In this example, system 100 comprises a transceiver 102 in communication with a number of wireless, battery-powered electronic devices, including a remotely controlled window blind 104, a window alarm 106, a wireless thermostat 108, and a lighting fixture controller 110. It should be understood that the term "battery-powered electronic devices" may comprise electronic devices that are purely powered by a battery, such as in the case of a door or window alarm, or by a combination of battery and other source of power, such as standard 110 VAC power or DC power provided by a non-extinguishable source. The latter may include devices such as a light fixture that is powered by 110 VAC, but controlled via a battery-powered lighting fixture controller, or other such devices.

The transceiver 102 may be part of a device such as a security panel, home energy management system, or other device/system where it is necessary for communications to occur between transceiver 102 and the one or more battery-powered electronic devices dispersed throughout a home or business. In another embodiment, transceiver 102 comprises a "repeater" that re-transmits communication signals from one or more security sensors to a main security panel (not shown), thus extending the range of such security sensors.

The transceiver 102 may want to know a condition or an operating status of one or more of the battery-powered electronic devices, or it may want to know about a physical condition sensed by one or more of these battery-powered electronic devices. For example, transceiver 102 may want to know the temperature being sensed by thermostat 108, the status of a window blind from remotely controlled window blind 104, the open/close status of a window being monitored by window alarm 106, an on/off status of lighting fixture controller 110, or a software/firmware version of any of the aforementioned battery-powered electronic devices.

Each of the aforementioned electronic devices is powered, at least in part, by one or more batteries. As such, they are generally designed to minimize power consumption by using one or more techniques known in the art for reducing power consumption. For example, it is a common practice to design battery-operated battery-powered electronic devices to de-energize a portion of their electronic circuitry, leaving only a portion active to monitor for incoming communication signals. When such a signal is detected, the remaining circuitry may be energized in order to accommodate the incoming communication signal. For example, the incoming communication signal may comprise a request from the transceiver 102 to provide information about the battery-powered electronic device or a physical condition sensed by one the battery-powered electronic device. Upon receipt of such a request, the battery-powered electronic device "wakes up" by energizing most or all of its electronic circuitry, processes the command, transmits a response, then re-enters the power saving mode of operation.

Another common technique to further minimize power consumption of a battery-powered electronic device is to combine the power saving technique described above with "power cycling" the receiver once every predetermined time period. For example, a receiver may be powered on once every two seconds for a period of 100 milliseconds to determine if a transmission signal is available for reception. If no transmission signal is detected, the receiver reverts to the power-saving mode of operation by de-energizing some or all of its related circuitry until the next time it is scheduled to wake up, or energize its circuitry. If a transmission signal is detected, it is received and, in one embodiment, processed to determine whether it is intended for the particular battery-powered electronic device. If so, the battery-powered electronic device typically responds to the received transmission signal by transmitting information requested by the transmission signal, such as a condition or an operating status of the battery-powered electronic device, or a physical condition sensed by the battery-powered electronic device, such as a temperature, pressure, humidity, window or door open/close status, an amount that a window or door is open, a digital photo or video stream monitored by the battery-powered electronic device, etc. This technique is referred to herein as "power cycling" and the time that the receiver spends "awake", or in an "active state", compared to the time it spends "asleep", or in a "dormant state", referred to as the duty cycle, expressed as a percentage.

When transceiver 102 is in need of information from one or more battery-powered electronic devices, or if it requires one or more of the battery-powered electronic devices to perform one or more actions, it transmits a signal that may be received by one or more of the battery-powered electronic devices. The signal is typically an RF modulated command requesting that one or more of the battery-powered electronic devices take some sort of action, such as performing a task, or reporting information such as a condition or an operating status of an battery-powered electronic device, or a physical condition sensed by an battery-powered electronic device. In other embodiments, the signal could be modulated and transmitted using one of any number of known modulation/transmission techniques.

In one embodiment, when transceiver 102 desires to communicate with one or more of the battery-powered electronic devices, it transmits a signal for a duration equal to, or greater than, the time period between receiver wake ups of a given battery-powered electronic device that it is attempting to communicate with, referred to herein as the transmission time duration. For example, if a receiver within window alarm 106 wakes up every three seconds to check for a transmission signal, then the transmission time duration is equal to, or greater than, three seconds. Transceiver 102 typically stores the transmission time duration in an electronic memory within transceiver 102 and may, in some embodiments, store a different time duration for each battery-powered electronic device or battery-powered electronic device type. Thus, when transceiver 102 sends a transmission signal to window alarm 106, the transmission time duration may comprise 3 seconds or more, while a transmission signal to remotely controlled window blind 104 might last only 1.7 seconds if the cycle time of remotely controlled window blind 104 is 1.7 seconds.

Figure 2:
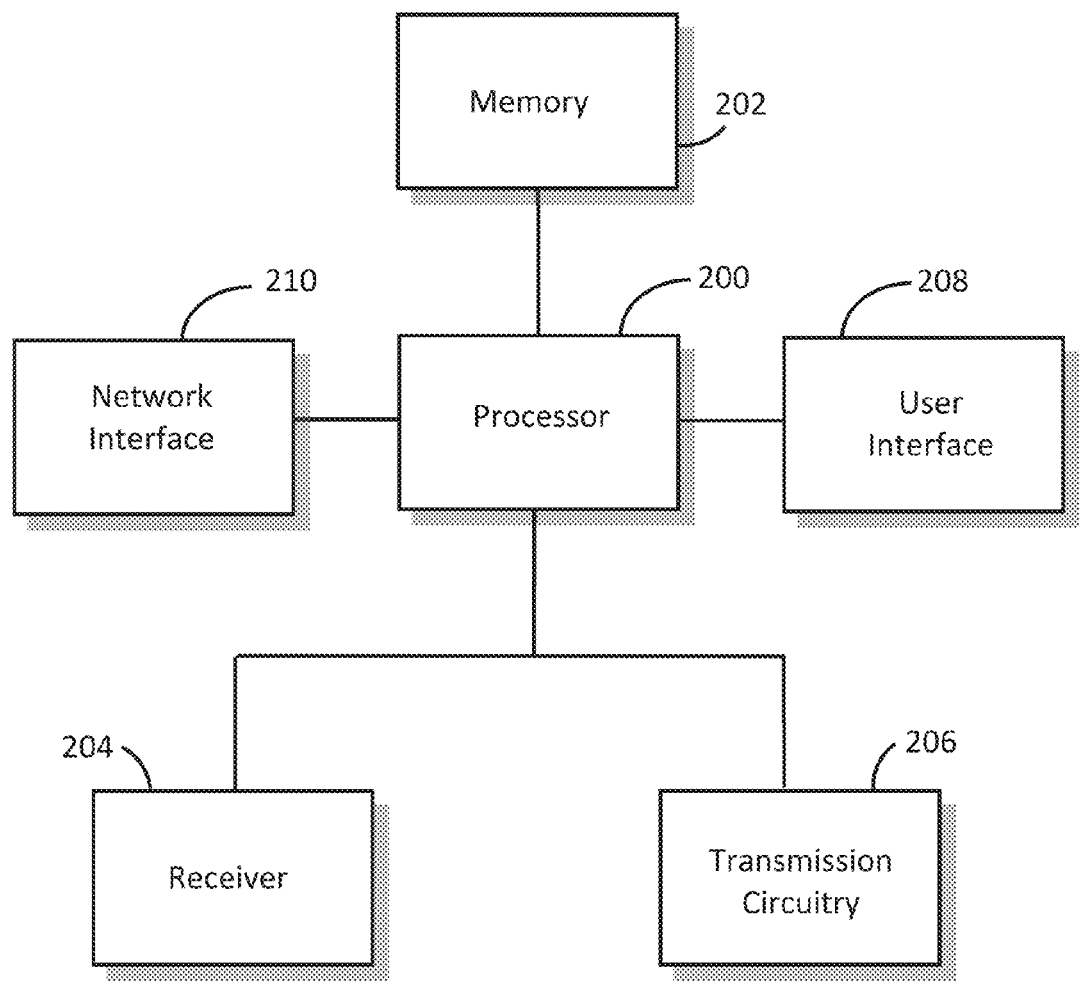
FIG. 2 is a functional block diagram of the transceiver shown in FIG. 1.

FIG. 2 is a functional block diagram of one embodiment of transceiver 102. Specifically, FIG. 2 shows processor 200, memory 202, receiver 204, transmitter 206, user interface 208, and network interface 210. It should be understood that not all of the functional blocks shown in FIG. 2 are required for operation of transceiver 102 in all embodiments, that the functional blocks may be connected to one another in a variety of ways, and that not all functional blocks necessary for operation of transceiver 102 are shown (such as a power supply), for purposes of clarity.

Processor 200 is configured to provide general operation of transceiver 102 by executing processor-executable instructions stored in memory 202, for example, executable code. Processor 200 typically comprises a general purpose processor, such as an ADuC7024 analog microcontroller manufactured by Analog Devices, Inc. of Norwood Mass., although any one of a variety of microprocessors, microcomputers, and/or microcontrollers may be used alternatively.

Memory 202 comprises one or more information storage devices, such as RAM, ROM, EEPROM, UVPROM, flash memory, CD, DVD, Memory Stick, SD memory, XD memory, thumb drive, or virtually any other type of electronic, optical, or mechanical memory device. Memory 202 is used to store the processor-executable instructions for operation of transceiver 102 as well as any information used by processor 200, such as one or more transmission time durations and an association with a respective battery-powered electronic device in communication with transceiver 102, information about each battery-powered electronic device, such as device name, manufacturer name, device serial number, software/firmware revision code, parameters associated with battery-powered electronic devices such as set points or thresholds, etc.

User interface 208 is coupled to processor 200 and allows a user to control operation of transceiver 102 and/or to receive information from transceiver 102. User interface 208 may comprise one or more pushbuttons, switches, sensors, keypads, and/or microphones that generate electronic signals for use by processor 200 upon initiation by a user. User interface 208 may additionally comprise one or more seven-segment displays, a cathode ray tube (CRT), a liquid crystal display (LCD), one or more light emitting diode displays (LEDD), one or more light emitting diodes (LEDs), light arrays, or any other type of visual display. Further, the electronic display could alternatively or in addition comprise an audio device, such as a speaker, for audible presentation of information to a user.

Transmitter 206 comprises electronic circuitry necessary to transmit signals from transceiver 102 to one or more battery-powered electronic devices typically located in a home or business. Such circuitry is well known in the art and may comprise BlueTooth, Wi-Fi, RF, optical, or ultrasonic circuitry, among others. Transmitter 206 receives messages from processor 200 and modulates the messages for wireless transmission to one or more battery-powered electronic devices.

Receiver 204 receives upconverted, modulated information sent by battery-powered electronic devices. The information typically comprises a condition or an operating status of an battery-powered electronic device, a physical condition sensed or monitored by an battery-powered electronic device, data, acknowledgments, or any other type of information. The received information may then be provided to processor 200 and/or stored in memory 202. In one embodiment, receiver 204 comprises circuitry well-known in the art for downconverting and demodulating received RF signals. In other embodiments, receiver 204 comprises circuitry well-known in the art for receiving information in accordance with other well-known techniques, such as acoustic information transmission, or light-modulation techniques.

Communication interface 210 is electronically coupled to processor 200 and comprises electronic circuitry necessary for transceiver 102 to communicate with remote devices over a network, such as the Internet. Typically, communication interface 210 comprises hardware, software and/or firmware necessary to transmit and receive information sent via one or more commonly-used network protocols, such as the well-known TCP/IP suite of protocols. Alternatively, or in addition, communication interface could comprise electronics and supporting software/firmware to support other well-known communication types, including Wi-Fi, Bluetooth, wireless telephone communications, fiber-optic communications, and so on.

Figure 3:
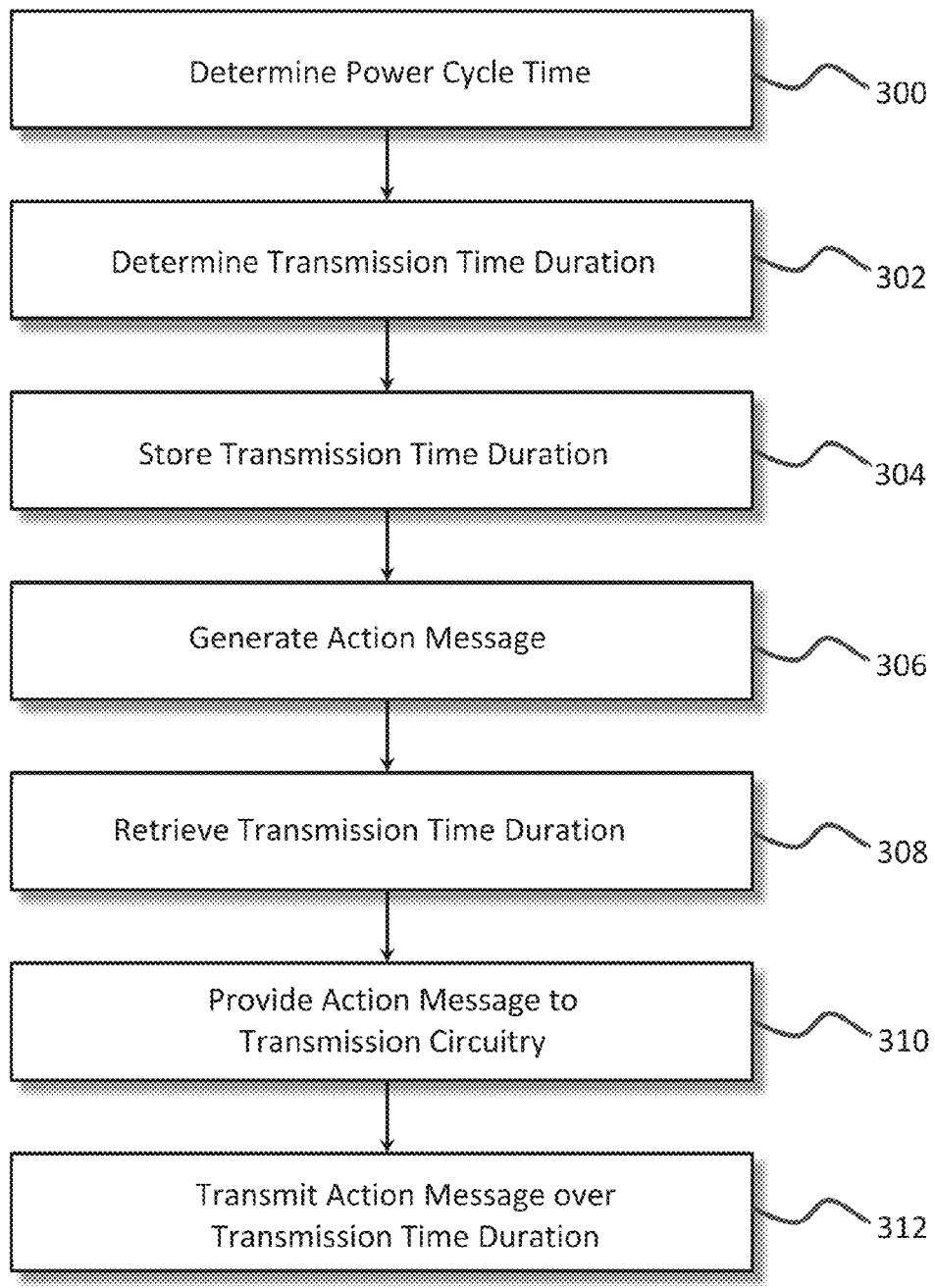
FIG. 3 is a flow diagram illustrating one embodiment for communicating with battery-powered electronic devices.

FIG. 3 is a flow diagram illustrating one embodiment communicating with battery-powered electronic devices. The method is implemented by a processor, such as processor 200 shown in FIG. 2 located in transceiver 102, executing processor-readable instructions stored in a memory, such as memory 202. It should be understood that in some embodiments, not all of the steps shown in FIG. 3 are performed and that the order in which the steps are carried out may be different in other embodiments. It should be further understood that some minor method steps have been omitted for purposes of clarity.

At block 300, processor 200 determines a power cycle time of at least one battery-powered electronic device. The power cycle time may be defined as a time period over which the battery-powered electronic device completes a cycle of operating in a dormant state of operation and operating in an active mode of operation. This may be determined in a number of ways. In one embodiment, a user of transceiver 102 may enter this information manually into transceiver 102 via user interface 208 after reading information about the battery-powered electronic device on instructions or packaging associated with the battery-powered electronic device.

In another embodiment, processor 200 generates a command for one or more battery-powered electronic devices to each report their respective power cycle times to transceiver 102. The command is sent to transmitter 206 where it is transmitted for a predetermined time period that exceeds a probable maximum power cycle time for any given battery-powered electronic device, or it is transmitted repeatedly, again for a predetermined time period that exceeds a probable maximum power cycle time for any given battery-powered electronic device. In this way, there is a very high probability that each battery-powered electronic device receives the command. In response, each battery-powered electronic device transmits their respective power cycle time. The power cycle times are received by receiver 204, and stored in association with the particular battery-powered electronic device that transmitted the power cycle time, in memory 202, by processor 200.

In yet another embodiment, memory 202 inside transceiver 102 may comprise a table of various battery-powered electronic devices and their associated power cycle times as supplied by manufacturers of the battery-powered electronic devices and stored at the time of manufacture of transceiver 102. In this embodiment, a user of transceiver 102 may select a particular device that is installed in the user's home or business via user interface 208 and, upon selecting one of the battery-powered electronic devices from a list of possible battery-powered electronic devices, a power cycle time associated with the selected battery-powered electronic device is noted by processor 200 by storing an indication of such in memory 202.

In yet still another embodiment, transceiver 102 downloads one or more power cycle times associated with either particular battery-powered electronic devices, or a large list of possible battery-powered electronic devices for use in homes or businesses, from a database located across a network, such as the Internet. This embodiment may be implemented in one of several ways.

For instance, in one embodiment, a user may enter information regarding one or more battery-powered electronic devices installed throughout the user's home or businesses via user interface 208. The information is received by processor 200 which, in turn, checks memory 200 to determine if a power cycle time associated with the information entered by the user has already been stored in association with the particular battery-powered electronic device. If not, processor 200 generates a message for transmission via network interface 210 to a database containing power cycle time information for a large number of battery-powered electronic devices, requesting a download of power cycle time information for one or more particular battery-powered electronic devices or, in another embodiment, a download of power cycle times related to a large number of battery-powered electronic devices. The downloaded information is received via network interface 210, provided to processor 200, and stored by processor 200 in memory 202.

At block 302, in one embodiment, processor 200 defines a transmission time duration for use in sending signals to one or more battery-powered electronic devices. The transmission time duration is a minimum time duration over which to transmit a signal to the one or more battery-powered electronic devices. In one embodiment, the transmission time duration is defined by a user of transceiver 102 manually entering the power cycle time of the battery-powered electronic device into transceiver 102 using user interface 208. Processor 200 receives this information and assigns the power cycle time power received from the user as the transmission time duration for either a particular device, or for any or all battery-powered electronic devices in the user's home or business. Processor 200 then stores the power cycle time in memory 202 as the transmission time duration for a particular battery-powered electronic device or a global transmission time duration for use when transmitting information to any battery-powered electronic device.

In another embodiment, where a list of battery-powered electronic devices and their associated power cycle times are stored in memory 202, the transmission time duration is determined when a user selects a certain battery-powered electronic device from the list of devices displayed to the user via user interface 208. The power cycle time associated with the battery-powered electronic device selected by the user is defined by processor 200 as the transmission time duration for the selected battery-powered electronic device.

In yet another embodiment, the transmission time duration is defined when an battery-powered electronic device "registers" with transceiver 102. For example, in wireless home security systems, a number of door and window sensors may be installed onto corresponding doors and windows in a home. Each of the door and window sensors are "registered" with a central security panel so that the central security panel knows how many sensors are distributed in the system, and other pertinent information, such as the type of sensor, the sensor's manufacturer, the location of each sensor, etc. Registration is typically accomplished by a user of the security system manually entering information into the central security panel, or by a "learning" process, where the central security panel is placed into a "learning" mode of operation, then one of the door or window sensors transmits a signal to the central security panel alerting it of its presence and other information, such as a sensor type, manufacturer information, serial number, etc. A similar process may be used to register battery-powered electronic devices with transceiver 102, if only to provide a power cycle time. In another embodiment, the power cycle time of an battery-powered electronic device can be transmitted along with the other registration information in a typical registration process. In any case, when the power cycle time is received from an battery-powered electronic device, processor 200 may then define the transmission time duration in accordance with the received power cycle time from any battery-powered electronic device.

In an embodiment where multiple transmission time durations may be defined, one transmission time duration for each battery-powered electronic device in the system, any of the embodiments discussed above may be used to select and store each battery-powered electronic device's power cycle time information in memory 202. For each battery-powered electronic device, processor 200 defines the transmission time duration as a time equal to or exceeding an battery-powered electronic device power cycle time.

In one embodiment, the method of determining an battery-powered electronic device power cycle time and the method of defining a transmission time duration may be combined into one step, by processor 200 simply using the power cycle time as the transmission time duration.

At block 304, processor 200 stores the one or more transmission time durations in memory 202 to be used in future communications with one or more battery-powered electronic devices.

At block 306, processor 200 generates an "action message" for transmission to one or more battery-powered electronic devices. The action message may be generated as a result of a predefined event occurring, such as the passage of a predetermined time period or a manual entry, by a user, to send a message from the transmitter to one or more battery-powered electronic devices, or as a result of one or more numerous other events occurring. The action message comprises a message instructing the battery-powered electronic device to perform an action, such as move a window shade, turn a light on or off, lock or unlock a door or window, take a temperature reading, a request for information, such as a request to send status information of the battery-powered electronic device, or some other information for use by the battery-powered electronic device.

At block 308, processor 200 accesses memory 302 to determine the transmission time duration associated with either the particular battery-powered electronic device chosen to receive the message or an battery-powered electronic device type. In another embodiment where a single transmission time duration is selected for all of the battery-powered electronic devices in the system, processor 200 retrieves the single transmission time duration from memory 202.

At block 310, in one embodiment, processor 200 sends the action message intended for one or more battery-powered electronic devices to transmitter 206, along with instructions to transmit the action message for a time period equal to or greater than the transmission time duration. In another embodiment, instructions are not provided by processor 200 to transmitter 206. Rather, processor 200 controls transmitter 206 to transmit the action message for a time period equal to or greater than the transmission time duration.

In one embodiment, transmitting the action message for a time period equal to or greater than the transmission time duration means to repeatedly transmit the action message until the transmission time duration expires. In another embodiment, it may involve transmitting a predetermined alert signal in the form of a continuous frequency, a predetermined digital sequence, or some other predetermined signal, for an amount of time greater than or equal to the transmission time duration. After transceiver 102 has transmitted the alert signal for a time period greater than or equal to the transmission time duration, processor 200 causes the transmitter to transmit the action message, as it is assumed that the battery-powered electronic device has received the alert signal and is ready and able to receive the actual message. The alert signal may be encoded in order to address messages to particular battery-powered electronic devices, as is well-known in the art. In yet another embodiment, transmitting the action message for a time period equal to or greater than the transmission time duration means to transmit the signal, either repeatedly or continuously, until an acknowledgement message is received from one or more of the intended battery-powered electronic devices.

At block 312, the action message is transmitted to one or more battery-powered electronic devices via transmitter 206, in accordance with the transmission time duration.

Using the above methodology, there is no need for complex, costly, or battery-consuming techniques to synchronize transmissions from transceiver 102 to battery-powered electronic devices.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components.

Accordingly, an embodiment of the invention can include a computer readable media embodying a code or processor-readable instructions to implement the methods of operation of the master device and other devices in network 100 in accordance with the methods, processes, algorithms, steps and/or functions disclosed herein.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

I claim:

1. A method for communicating with a battery-powered electronic device having a wireless receiver, wherein the receiver is power-cycled once every predetermined time period, comprising:
   determining a power cycle time of the battery-powered electronic device, the power cycle time comprising a time period over which the battery-powered electronic device completes a cycle of operating in a dormant state of operation and operating in an active mode of operation;
   defining a transmission time duration equal to or greater than the power cycle time;
   storing the transmission time duration in a memory; and
   continuously transmitting a signal intended for the battery-powered electronic device for a time period equal to or greater than the transmission time duration.

2. The method of claim 1, wherein defining the transmission time duration comprises:
   manually entering the transmission time duration via a user interface.

3. The method of claim 1, wherein defining the transmission time duration comprises:
   selecting the transmission time duration at the time of manufacture of the battery-powered electronic device; and
   storing the transmission time duration in the memory at the time of manufacture of the battery-powered electronic device.

4. The method of claim 1, further comprising:
   defining a second transmission time duration equal to or greater than a second predetermined time period associated with a second battery-powered electronic device;
   storing the second transmission time duration in the memory; and
   transmitting a second signal intended for the second battery-powered electronic device by the transmitter, the second signal lasting for at least the second transmission time duration.

5. The method of claim 1, wherein the signal comprises an alert signal for placing the battery-powered electronic device into an active mode of operation, the method further comprising:
   transmitting the alert signal; and
   transmitting an action message following transmission of the alert signal, the action message instructing the battery-powered electronic device to perform an action.

6. The method of claim 5, wherein transmitting the signal continuously comprises transmitting the alert signal repeatedly until the transmission time duration has elapsed.

7. The method of claim 1, wherein continuously transmitting a signal intended for the battery-powered electronic device comprises transmitting an alert signal repeatedly until at least the transmission time duration has elapsed, the alert signal for instructing the battery-powered electronic device to enter an active state of operation.

8. The method of claim 1, wherein continuously transmitting a signal intended for the battery-powered electronic device comprises transmitting the signal repeatedly until at least the transmission time duration has elapsed.

9. A system for communicating with a battery-powered electronic device, comprising;
   the battery-powered electronic device, comprising:
      a receiver for receiving wireless signals;
      a memory for storing processor-executable instructions and a power cycle time;
      a processor for executing the processor-executable instructions that cause the battery-powered device to process signals received by the receiver and to place at least a portion of circuitry associated with the battery-powered electronic device in a power-saving mode of operation at predetermined time intervals equal to the power cycle time; and
   a transceiver located remotely from the battery-powered electronic device, comprising:
      a transmitter to wirelessly transmit the wireless signals to the battery-powered electronic device;
      a memory for storing processor-executable instructions and a transmission time duration, the transmission time duration equal to or greater than the power cycle time; and
      a processor coupled to the memory and transmitter, for executing the processor-executable instructions that cause the transceiver to retrieve the transmission time duration from the memory, to generate a signal intended for the battery-powered electronic device, and to send the signal to the transmitter for transmission to the battery-powered electronic device;
      wherein the transmitter transmits the signal continuously for a duration equal to or greater than the transmission time duration.

10. The system of claim 9, wherein the transceiver further comprises:
    a user interface for entering the transmission time duration, wherein the processor receives the transmission time duration from the user interface and stores it in the memory.

11. The system of claim 9, wherein the memory additionally stores a list of battery-powered electronic devices and associated power cycle times for each battery-powered electronic device, and the transceiver further comprises:
    a user interface for displaying the list of battery-powered electronic devices, and for receiving a selection of one of the battery-powered electronic devices displayed in the list from a user of the system;
    wherein the processor defines the transmission time duration as the power cycle time associated with the selected battery-powered electronic device.

12. The system of claim 9, wherein the memory further stores a second transmission time duration associated with a second battery-powered electronic device; and wherein the processor-executable instructions further comprise instructions that cause the transceiver to:
retrieve the second transmission time duration from the memory;
generate a second signal intended for the second battery-powered electronic device; and
send the second signal to the transmitter for transmission to the second battery-powered electronic device;
wherein the transmitter transmits the second signal for a duration equal to or greater than the second transmission time duration.

13. The system of claim 9, wherein the signal comprises an alert signal for placing the battery-powered electronic device into an active mode of operation, wherein the transmitter transmits the alert signal and then transmits an action message following transmission of the alert signal, the action message instructing the battery-powered electronic device to perform an action.

14. The system of claim 13, wherein the transmitter transmits the alert signal repeatedly until the transmission time duration has elapsed.

15. The system of claim 9, wherein transmission of the signal intended for the battery-powered electronic device comprises transmitting an alert signal repeatedly until at least the transmission time duration has elapsed, the alert signal for instructing the battery-powered electronic device to enter an active state of operation.

16. The system of claim 9, wherein transmission of the signal intended for the battery-powered electronic device comprises transmitting the signal repeatedly until at least the transmission time duration has elapsed.

\* \* \* \* \*